United States Patent
Böhm et al.

[11] Patent Number: 5,904,913
[45] Date of Patent: May 18, 1999

[54] PROCESS FOR OBTAINING A HIGH-HYDROGEN, LOW-CARBON-MONOXIDE GAS

[75] Inventors: Gustav Böhm, Überlingen; Theodor Staneff, Bermatingen; Jürgen Steinwandel, Oberuhldingen, all of Germany

[73] Assignee: Daimler-Benz AG, Germany

[21] Appl. No.: 08/790,822

[22] Filed: Jan. 30, 1997

[30] Foreign Application Priority Data

Jan. 30, 1996 [DE] Germany .................. 196 03 222

[51] Int. Cl.$^6$ ...................................................... C01B 3/02
[52] U.S. Cl. .................. 423/648.1; 252/373; 422/190
[58] Field of Search .................... 423/648.1; 252/373

[56] References Cited

U.S. PATENT DOCUMENTS

| | | |
|---|---|---|
| 3,615,164 | 10/1971 | Baker et al. . |
| 3,631,073 | 12/1971 | Cohn et al. . |
| 4,840,783 | 6/1989 | Quang et al. . |
| 4,847,231 | 7/1989 | Graetzel et al. . |
| 4,865,624 | 9/1989 | Okada . |
| 4,946,667 | 8/1990 | Beshty ............................. 423/648.1 |
| 5,093,102 | 3/1992 | Durand et al. ................... 423/648.1 |

FOREIGN PATENT DOCUMENTS

| | | |
|---|---|---|
| 0306945 | 3/1989 | European Pat. Off. . |
| 04250851 | 9/1992 | European Pat. Off. . |
| 0 650 922 A1 | 5/1995 | European Pat. Off. . |
| 0 650 923 A1 | 5/1995 | European Pat. Off. . |
| 0650922 | 5/1995 | European Pat. Off. . |
| 4420753 | 9/1995 | Germany . |
| 62-105901 | 5/1987 | Japan . |
| 63-274063 | 11/1988 | Japan . |

OTHER PUBLICATIONS

Chemical Abstracts vol. 115 (1991): 240892 d.
Chemical Abstracts vol. 74 (1971): 35106 u.
Chemical Abstracts vol. 114, No. 20 (1991), S. Kasaoka et al.
"Proceedings of the 26th Intersociety Energy Conversion Engineering Conference", vol. 3, Aug. 4–9, 1991, American Nuclear Society, J.C.Amphlett et al.
European Search Report dated May 29, 1997.

*Primary Examiner*—Wayne Langel
*Attorney, Agent, or Firm*—Evenson, McKeown, Edwards & Lenahan, P.L.L.C.

[57] ABSTRACT

The invention relates to a process and an apparatus for obtaining a high-hydrogen, low-carbon-monoxide gas which is suitable for feeding low-temperature fuel cells in electric vehicles. A high-hydrogen gas mixture is generated by means of a methanol reforming reaction, using a Cu- and ZrO-containing catalyst material. The carbon monoxide content of the gas is decreased to a concentration of less than approximately 100 ppm by means of a selective methanization using a Ru- and TiO$_2$-containing catalyst material and/or by means of a selective oxidation using a Pt- and TiO$_2$-containing catalyst material.

6 Claims, 2 Drawing Sheets

PROCESS FOR OBTAINING A HIGH-HYDROGEN, LOW-CARBON-MONOXIDE GAS

BACKGROUND AND SUMMARY OF THE INVENTION

This invention relates to a process and an apparatus for obtaining a high-hydrogen, low-carbon-monoxide gas (particularly for feeding low-temperature fuel cells in electric vehicles) by means of a methanol reforming reaction, using a Cu- and $ZrO_2$-containing catalyst material. The process and apparatus according to the invention produces a high-hydrogen gas mixture whose CO content is reduced to less than 100 ppm.

A process and apparatus of this type are disclosed in U.S. Pat. No. 4,840,783. There, the Cu constituent is provided in the reforming reactor, for example, by introducing CuO into the reactor and reducing it to form elemental copper. This is accomplished by causing an $N_2/H_2$ mixture which has an $H_2$ content of 3% to pass through at temperatures of between 100° C. and 270° C. for 72 h. In a subsequent stage, the initial gas mixture of the methanol reforming reactor is subjected to a selective methanization for reducing the CO concentration.

A detailed process for selective methanization is disclosed in U.S. Pat. No. 3,616,164, in which a ruthenium or rhodium catalyst on an aluminum oxide carrier material is used. By means of this process, the CO concentration in the gas mixture can be lowered to less than 100 ppm. It is also known that, in addition to the selective methanization, the CO content in a high-hydrogen gas mixture can alternatively be decreased by the selective oxidation with the use of a platinum, rhodium or ruthenium catalyst material on an $Al_2O_3$ carrier (e.g., U.S. Pat. No. 3,631,073), or by the selective hydrogen separation by means of a membrane consisting of a palladium alloy (e.g., Japanese Published Patent Application JP 62-105901(A)).

In *Chemical Abstracts,* Volume 115, 1991, No. 240892d, a ruthenium/titanium catalyst is disclosed for the selective methanization of carbon dioxide at room temperature and atmospheric pressure.

*Chemical Abstracts,* Volume 74, 1971, No. 35106u, describes the selective methanization of carbon monoxide in a gas mixture, which contains hydrogen, carbon dioxide and carbon monoxide, at temperatures in the range of between 125° C. and 300° C. using ruthenium-containing catalysts.

Published European Patent Applications EP. 0 650 922 A1 and EP 0 650 923 A1 describe processes and apparatuses for the catalytic removal of carbon monoxide in a high-hydrogen gas by selective oxidation and/or selective methanization. For the selective oxidation, $Pt/Al_2O_3$, $Ru/Al_2O_3$ or Pt zeolite carrier catalyst material are suggested. For the selective methanization, the use of an $Ru/Al_2O_3$ carrier catalyst material is suggested.

One object of the present invention is to provide a process and an apparatus of the initially mentioned type which produces a high-hydrogen and low-carbon-monoxide gas suitable for feeding low-temperature fuel cells, in a mobile systems, with expenditures which are as low as possible.

This object is achieved according to the invention by means of a methanol reforming reaction using a Cu- and $ZrO_2$-containing material, followed by removal of carbon monoxide by selective methanization on a special ruthenium catalyst material with a $TiO_2$ carrier and/or by means of a selective oxidation using a platinum catalyst material with a $TiO_2$ carrier. In this manner, a very high methanol conversion rate of over 98% can be achieved in the case of a high integral catalyst load of up to 10 $Nm^3H_2/kg_{cat}h$, as well as a CO concentration of less than 100 ppm, preferably below 50 ppm. ($Nm^3$ refers to a cubic meter, at standard conditions.)

In a further embodiment of the invention, the Cu constituent of the catalyst is provided by reducing CuO by means of an $N_2/H_2$ mixture with an $H_2$ content of more than 5% and up to 20%. In this manner, a sufficiently active catalyst material is obtained which withstands the above-mentioned, high integral catalyst load, to which, in addition, an isothermal reaction course may contribute which has a high gas flow rate.

According to another feature of the invention, it is found that, a particular composition of the $TiO_2$-containing catalyst carrier material is favorable for selective oxidation of the carbon monoxide.

Another advantage for the selective methanization and/or the selective oxidation is an unsteady reaction course which has a periodically changing flow direction at temperature below 200° C. and 120° C. Thus, both types of the selective CO conversion can be used together.

A further embodiment of the invention contains a methanol reforming reactor in a tube bundle construction which is designed specifically for a high integral catalyst load with a high methanol conversion rate.

To improve the heat transfer capacity of the tube bundle arrangement of the methanol reforming reactor, in still another embodiment, the reaction tube or tubes are provided with heat transfer ribs arranged on their side facing the tempering fluid, and/or on their side facing the catalyst material, with heat conduction webs.

Other objects, advantages and novel features of the present invention will become apparent from the following detailed description of the invention when considered in conjunction with the accompanying drawings.

DETAILED DESCRIPTION OF THE DRAWINGS

Figure 1:
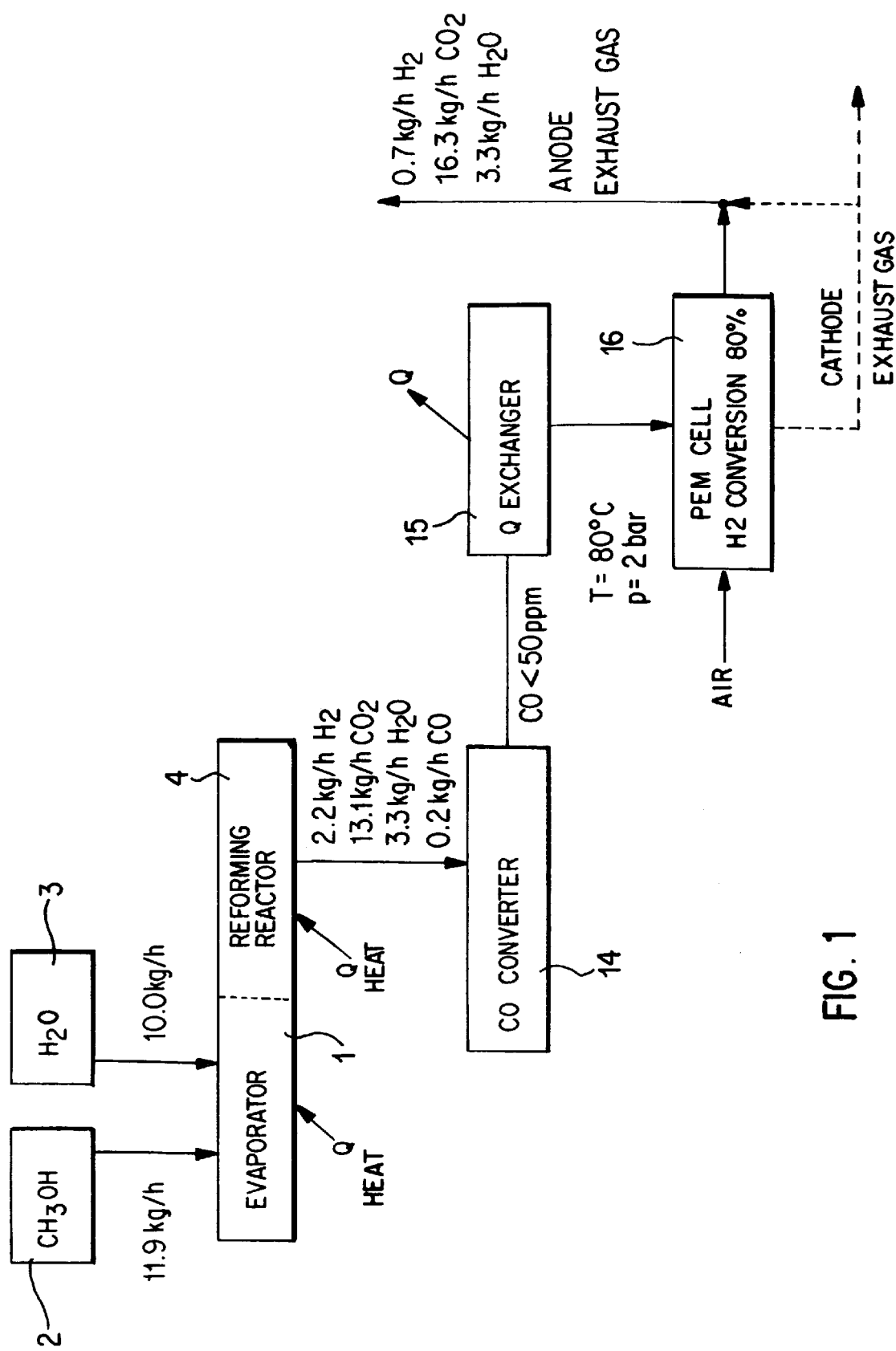
FIG. 1 is a block diagram of an apparatus for obtaining a high-hydrogen, low-carbon-monoxide gas for feeding a PEM fuel cell of an electric vehicle.

FIG. 1 is a schematic overview of the required reaction-related and process-related constituents and steps for obtaining a gas which consists essentially of hydrogen and which can be used for feeding a PEM fuel cell in a mobile electric drive. The fuel consists of methanol which can easily be stored in the vehicle in liquid form. The mass flows indicated in FIG. 1 are based on a reactor output of 25 $Nm^3H_2/h$ (standard conditions).

In FIG. 1, methanol from a methanol tank 2 is fed to an evaporator 1 at a rate of 11.9 kg/h, and water from a water reservoir 3 is fed to the evaporator 1 at a flow rate of 10.0 kg/h. In the evaporator 1, the later reaction partners methanol and water are evaporated jointly or separately at the desired stoichiometric ratio with the addition of heat (Q) and are superheated to a reactor input temperature of approximately 250° C. The superheated methanol/water gas mixture is fed into a methanol reforming reactor 4 in which the methanol reforming reaction takes place at a pressure of up to 10 bar (preferably of approximately 5 bar), and a temperature of between 220° C. and 280° C.

Figure 2:
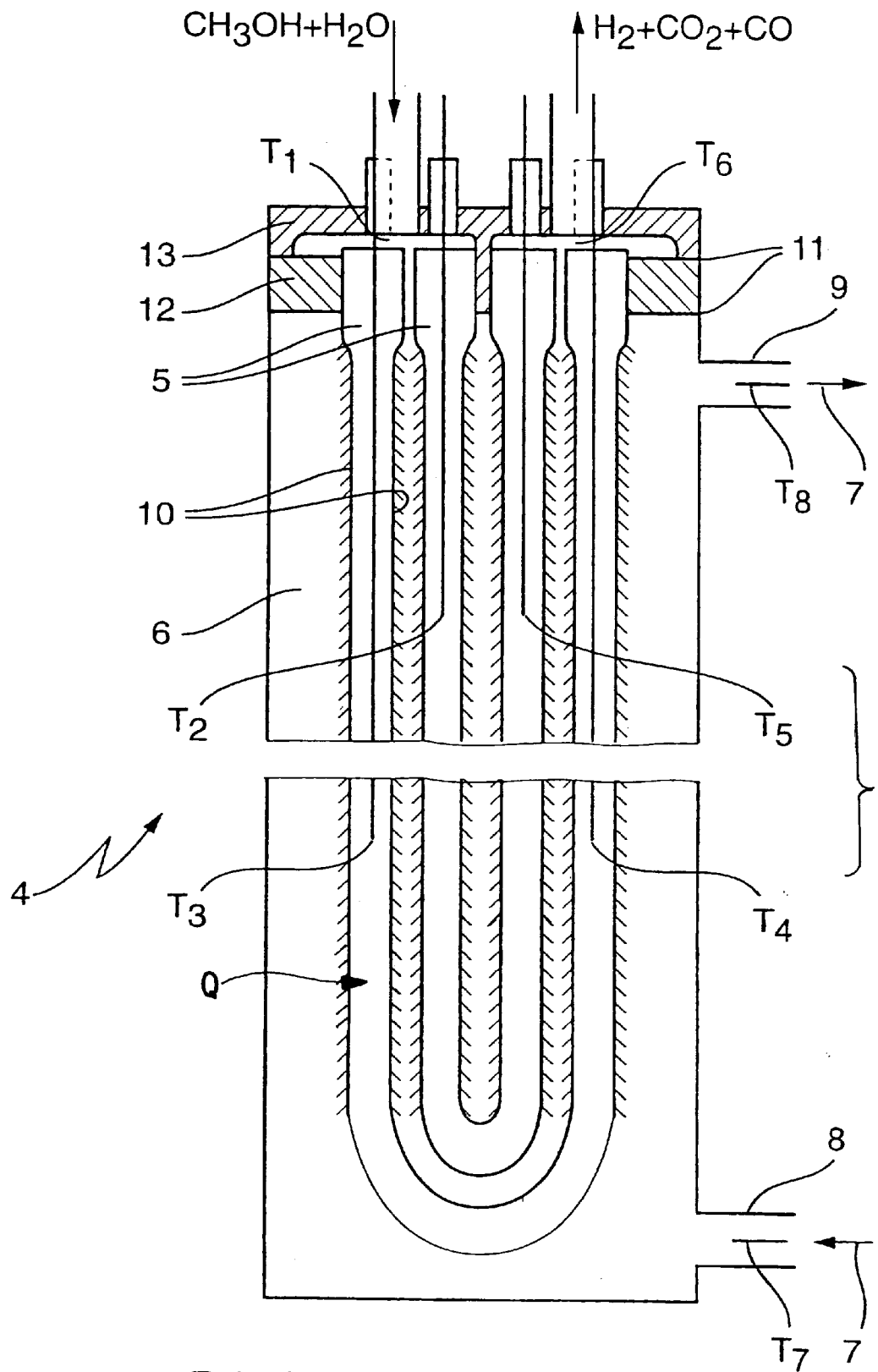
FIG. 2 is a longitudinal sectional view of a methanol reforming reactor in a U-tube-bundle construction, used in the apparatus of FIG. 1.

FIG. 2 illustrates a reactor having a U-tube bundle construction which is suitable for the reforming of methanol. The requirements on the reactor for vehicle specific use, in addition to the above-mentioned pressure and temperature ranges, are given by the following parameters which determine its design. The methanol reaction is higher than 98%, while the CO content in the initial gas mixture is below 2%, and the concentration of other accompanying products is below 1,000 ppm. For load jumps of approximately 100%, the dynamic response times of the reactor are in the range of seconds; and the integral catalyst utilization is preferably above 4 $Nm^3H_2/kg_{cat}h$. Furthermore, the stoichiometry of the feed gas mixture $CH_3OH:H_2O$ is between 1:1.3 and 1:2.0. These requirements can be achieved only by the use of highly active and selectively operating catalysts in connection with an optimized course of the process, because thermodynamically the reaction to the desired $H_2$ and $CO_2$ is definitely not favored. The desired conversion rates of higher than 98% require reaction temperatures of more than 200° C.; thus high reaction pressures impair the yield with respect to thermodynamics. However, this pressure effect is not particularly pronounced, and can be compensated by a moderate rise in temperature if the absolute pressure does not exceed 20 bar.

On the other hand, for general operational reasons as well as with respect to the thermodynamic CO production, an operating temperature that is as low as possible is desirable, which necessitates the use of highly active metal-containing catalyst systems. However, precious metal catalysts of the platinum group (which are particularly active in this respect) produce, in addition to the desired reaction products, a comparatively high amount of methane. (Analogously, the same is true of nickel-containing catalysts.) It was found that low-temperature catalysts composed of a Cu/ZnO on an $Al_2O_3$ carrier material, and particularly on a $ZrO_2$ carrier material, are suitable for this purpose, as they are customary for the synthesis of methanol.

However, this alone does not achieve the comparatively high integral catalyst load of at least 4 $Nm^3H_2/kg_{cat}h$ which is required because of the compactness of the reactor necessary for mobile applications. Thus, a high heat flow is entered into the catalyst bed, which is required because of the endothermal overall reaction. For this reason, the reactor has a special design.

As illustrated in FIG. 2, the methanol reforming reactor 4 has a tube bundle arrangement with several U-tubes 5 through which the reforming gas mixture flows. The U-tubes 5 are situated vertically in a chamber 6 through which a heat transfer oil 7 flows, from an inlet 8 arranged in the lower area along the U-tubes 5, to an outlet 9 arranged in the upper area. Either a parallel or counterflow course can be used for the gas mixture, relative to the thermal oil flow. The gas mixture is introduced into the reactor 4 approximately at the temperature of the entering thermal oil 7. A metallic material, preferably steel, is used as the tube material. (Although not essential to the invention, it is advantageous if a special noncorrosive steel is used). The interior of the tubes 5 contain a catalyst bed with the Cu-containing catalyst material with a $ZrO_2$-containing carrier in the form of a pellet filling. On their exterior, the tubes are provided with heat transmission ribs 10 in order to promote the heat transfer from the heated thermal oil 7 into the tube interior. In addition, heat conduction webs (not shown) are provided on the interior of the tube for the same purpose. A high gas flow rate also improves the transfer of heat into the catalyst bed in the tube interior, in which case a sufficient heat transfer, while the median flow rate is simultaneously high, requires basically small reaction tube diameters. At various points, temperature measuring probes ($T_1$ to $T_8$) are provided in the reactor 4, for monitoring the maintaining of the temperature conditions.

On the other hand, the necessity of adapting the catalyst pellet diameters to the tube diameters to take into account the problem of the edge running imposes a practical limitation on the minimum possible reaction tube diameter. that is, smaller catalyst pellet diameters mean a higher flow resistance, which causes the backpressure to rise rapidly, impairing the efficiency of the reactor. It was found that favorable conditions are achieved when the median pellet diameter is between ⅕ and ¹⁄₁₀ of the inside tube diameter, and the inside tube diameter is between 1 cm and 2.5 cm. The upper value should not be exceeded because of the heat transport problems which otherwise can no longer be compensated.

In consideration of the later long-term stability, defined activation conditions are decisive for the Cu-containing catalyst material. Before use, the copper is completely or partially present as a stable CuO for the purpose of a better handling. After the reaction tubes 5 are charged with catalyst granules which are appropriately adapted to the tube size, the catalyst filling is activated to elemental copper by reduction of the copper oxide. For this purpose, an $N_2/H_2$ mixture is used which has an $H_2$ content of at least 5% and at most 20%, and the flow rate is adjusted such that a temperature of 300° C. is not exceeded at any point of the catalyst bed. In the present case, this is achieved at space velocities of 2,000 $h^{-1}$ or more. The preheating temperature of the catalyst material must in this case be limited to values between a minimum of 150° C. and a maximum of 200° C. The reaction pressure in the case of the given conditions is 1 bar-absolute. The temperature limitation avoids a pronounced copper agglomeration to larger particles, which would result in a loss of activity. After the activating procedure, in the subsequent reaction operation, the catalyst filling has the highest possible activity which depends on the respective selected operating temperature.

It has been found that, for a methanol conversion of above 98% at a maximum reaction tube length of 160 cm, a reaction temperature of at least 260° C. should be selected. Lower reaction temperatures require longer reaction courses, and therefore larger reactor tube lengths. By means of the mentioned parameters, the reforming reactor 4 according to FIG. 2 achieves a constant output of 10 $Nm^3H_2/h$ with a catalyst mass of 1.3 kg in that the reactor 4 permits an integral catalyst load of approximately 8 $Nm^3H_2/kg_{cat}h$. In this case, a minimum reactor temperature of approximately 280° C. is required for a virtually 100% methanol conversion.

Furthermore, a response time of the reactor 4 which is in the range of seconds is obtained in the case of load jumps of 10%, (1 $Nm^3H_2/h$) to 100% (10 $Nm^3H_2/h$), as required for the use in electric vehicles. An optimal thermal economy of the reactor with a minimum possible catalyst volume is decisive for this load change action. In this case, the integral heat entry into the reactor 4 can be controlled by the pumping speed of the heat transfer oil circulating system in connection with its heating output.

The heat transfer-oil filled chamber 6 of the reactor is covered by a lid 12, which is provided with graphite seals 11 and holds the U-tubes 5. A hood 13 is placed on the lid 12 and contains, in addition to the gas inlet and the gas outlet, devices (not shown) for the controllable blocking of the individual reaction tubes 5. This permits an operation in which, under a full load, a uniform flow takes place on and through all reaction tubes 5 of the reactor 4 while, in the partial-load range, the flow on and through individual reaction tubes is throttled by the mechanical control devices, while the remaining reaction tubes continue to be operated with the catalyst load of the full-load point.

Under all technically relevant operating conditions, the CO concentrations which occur in the initial gas mixture of the reforming reactor 4 are well above the tolerance threshold of approximately 50 ppm for PEM fuel cells, as can be recognized from the gas composition illustrated in FIG. 1. As the result of the reaction technique, however, this threshold value cannot be reached by way of the reforming reaction itself, and accordingly the CO concentration is reduced in a CO converter 14 which follows, as illustrated in FIG. 1. This CO converter 14 contains a $TiO_2/Al_2O_3/Ru/RuO_x$ catalyst material with a $Ru/RuO_x$ fraction between 2.0% and 4.0% and a $TiO_2$ composition of 75% rutile and 25% anatase for the implementation of a selective methanization (that is, hydrogenation) of CO in the $CO_2$ excess in a low-temperature reaction with a maximum temperature of approximately 200° C., and (alternatively or in addition) a $TiO_2/Al_2O_3/Pt$ catalyst material with a Pt-fraction of between 0.5% and 1.5% and also a $TiO_2$ composition of 75% rutile and 25% anatase for causing a selective oxidation of CO in the $H_2$ excess in a low-temperature reaction with a maximum temperature of approximately 120° C. Depending on the requirements, these two reactions can be provided separately or coupled. Both reactions are strongly exothermal which is why a strictly isothermal reaction course or a non-steady reactor operation with a periodically changing gas flow direction is used in the CO converter. Alternatively, a membrane technique can be used, in which the hydrogen in the initial gas mixture of the reforming reactor is separated by diffusion through a composite membrane structure with an active separation layer made of a palladium alloy, which has a thickness of less than 20 nm, as well as a microporous, ceramic or metallic supporting structure at temperatures of above 250° C.

In each case, the CO converter 14 provides at its output a high-hydrogen gas whose CO concentration is below 50 ppm. As shown in FIG. 1, this high-hydrogen gas is supplied to a heat exchanger 15 which cools it to approximately 80° C. and feeds it to a PEM fuel cell 16 which operates at this temperature and at a pressure of approximately 2 bar and which is also supplied with atmospheric oxygen. The fuel cell 16 permits an $H_2$ conversion of approximately 80%.

Because of its construction which can be implemented in a compact manner, the system of FIG. 1, provides an optimized process which is particularly suitable for the use in electric vehicles with PEM fuel cells and methanol accumulators.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for obtaining a high-hydrogen, low-carbon-monoxide gas, comprising the steps of:

producing a high-hydrogen gas mixture from methanol by means of a methanol reforming reaction using a catalyst material selected from the group consisting of $Cu/ZrO_2$ and $Cu/ZnO/ZrO_2$; and removing carbon monoxide from the high-hydrogen gas mixture to a concentration of less than approximately 100 ppm, by means of selective methanization using a $TiO_2/Al_2O_3/Ru/RuO_x$ carrier catalyst material with a $Ru/RuO_x$ fraction between 2% and 4% and a $TiO_2$-composition of 75% rutile and 25%.

2. Process according to claim 1, further comprising steps for providing a Cu constituent of the catalyst material for the methanol reforming reaction, including:

introducing CuO into the reforming reactor; and reducing said CuO to elemental Cu by causing an $N_2/H_2$ mixture to pass through which has an $H_2$-content of between 5% and 20%, the flow rate of the $N_2/H_2$ mixture being selected such that the temperature at each point of the catalyst bed does not rise above 300° C.

3. Process according to claims 1 wherein selective methanization is carried out at temperatures below 200° C. by means of a non-steady reaction course with a periodically changing flow direction.

4. Process for obtaining a high-hydrogen, low-carbon-monoxide gas, comprising the steps of:

producing a high-hydrogen gas mixture from methanol by means of a methanol reforming reaction using a catalyst material selected from the group consisting of $Cu/ZrO_2$ and $Cu/ZnO/ZrO_2$; and removing carbon monoxide from the high-hydrogen gas mixture to a concentration of less than approximately 100 ppm, by means of selective methanization using a $TiO_2/Al_2O_3/Ru/RuO_x$ carrier catalyst material with a $Ru/RuO_x$ fraction between 2% and 4% and a $TiO_2$-composition of 75% rutile and 25% anatase, and selective oxidation using a Pt- and $TiO_2$-containing catalyst material.

5. Process according to claim 1 wherein the selective oxidation is performed by means of a $TiO_2/AlO_2O_3/Pt$ carrier catalyst material with a Pt-fraction between 0.5% and 1.5% and a $TiO_2$-composition of 75% rutile and 25% anatase.

6. Process according to claims 4 wherein selective methanization is carried out at temperatures below 200° C. and selective oxidation is carried out at temperatures below 120° C., each by means of a non-steady reaction course with a periodically changing flow direction.

* * * * *